United States Patent
Cobb et al.

(10) Patent No.: US 12,530,855 B2
(45) Date of Patent: Jan. 20, 2026

(54) INKING A MIXED REALITY IMAGE

(71) Applicant: Microsoft Technology Licensing, LLC, Redmond, WA (US)

(72) Inventors: Jonathon Burnham Cobb, Vancouver (CA); Prashant, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 224 days.

(21) Appl. No.: 18/384,994

(22) Filed: Oct. 30, 2023

(65) Prior Publication Data

US 2025/0139904 A1    May 1, 2025

(51) Int. Cl.
*G06T 19/00* (2011.01)
*G06F 3/01* (2006.01)
*G06T 11/20* (2006.01)

(52) U.S. Cl.
CPC ............ *G06T 19/006* (2013.01); *G06F 3/013* (2013.01); *G06T 11/203* (2013.01)

(58) Field of Classification Search
CPC ...... G06T 19/006; G06T 11/203; G06F 3/013
See application file for complete search history.

(56) References Cited

U.S. PATENT DOCUMENTS

| | | | |
|---|---|---|---|
| 10,515,479 B2 | 12/2019 | Piya et al. | |
| 11,043,038 B1 | 6/2021 | Ngai et al. | |
| 11,340,695 B2* | 5/2022 | McCall | G06F 1/163 |
| 11,403,848 B2* | 8/2022 | Choi | G06V 10/25 |
| 2013/0127836 A1* | 5/2013 | Joshi | G06T 19/00 |
| | | | 345/419 |
| 2014/0240322 A1* | 8/2014 | Brumer | G06T 5/70 |
| | | | 345/442 |
| 2016/0019711 A1 | 1/2016 | Shapira et al. | |
| 2017/0236021 A1* | 8/2017 | Petkov | G06V 30/2268 |
| | | | 345/179 |
| 2017/0316612 A1* | 11/2017 | Moteki | G06T 15/20 |
| 2018/0101986 A1* | 4/2018 | Burns | G06T 19/006 |
| 2018/0182178 A1* | 6/2018 | Varanasi | H04N 13/246 |

(Continued)

OTHER PUBLICATIONS

Fidalgo, et al., "A Survey on Remote Assistance and Training in Mixed Reality Environments", In Journal of IEEE Transactions on Visualization and Computer Graphics, vol. 29, Issue: 5, Feb. 22, 2023, pp. 2291-2303.

(Continued)

*Primary Examiner* — Ryan M Gray
(74) *Attorney, Agent, or Firm* — Seed Intellectual Property Law Group LLP

(57) ABSTRACT

Mixed reality images are inked with strokes and other annotations, permitting a headset, robot, or drone operator to see coherent graphical additions made by a remote user. Some embodiments get an ink stroke in an annotation which includes multiple points in a screen space, select a ray origin point based on at least samples of the annotation points, obtain a spatial mesh representation of at least a portion of an object which is at least partially shown in a mixed reality image, cast a ray from the ray origin point to the spatial mesh representation, thereby determining a ray-mesh intersection point, choose a projection plane, project the annotation onto the projection plane, and configure a display with the mixed reality image including the projected ink stroke or other annotation.

20 Claims, 6 Drawing Sheets

(56) References Cited

U.S. PATENT DOCUMENTS

| | | | |
|---|---|---|---|
| 2018/0239434 A1* | 8/2018 | Lu | G06T 11/203 |
| 2018/0350099 A1* | 12/2018 | Yerkes | G06T 19/006 |
| 2021/0104102 A1* | 4/2021 | Cavallo | G06T 15/40 |
| 2021/0232211 A1* | 7/2021 | McCall | G06F 3/0304 |
| 2022/0346888 A1 | 11/2022 | Luo et al. | |
| 2024/0127550 A1* | 4/2024 | Canberk | G06F 3/012 |
| 2024/0290015 A1* | 8/2024 | Gehlaut | G06T 11/203 |

OTHER PUBLICATIONS

Mohr-Ziak, et al., "Mixed Reality Light Fields for Interactive Remote Assistance", In Proceedings of CHI Conference on Human Factors in Computing Systems, Apr. 25, 2020, 12 Pages.

Nuernberger, et al., "Multi-view gesture annotations in image-based 3D reconstructed scenes", In Proceedings of the 22nd ACM Conference on Virtual Reality Software and Technology, Nov. 2, 2016, pp. 129-138.

Wyvill, et al., "Field Functions for Implicit Surfaces", In The Visual Computer, vol. 5, No. later than Jan. 31, 1989, pp. 75-82.

Edwin Catmull and Raphael Rom, "A Class of Local Interpolating Splines", Computer Aided Geometric Design, 1974, pp. 317-326, no later than Dec. 31, 1974, 10 pages.

Cem Yuksel, et al., "Parameterization and Applications of Catmull-Rom Curves", preprint submitted to Computer-Aided Design, Aug. 23, 2010, 24 pages.

"Use annotations with Dynamics 365 Guides", retrieved from << https://learn.microsoft.com/en-us/dynamics365/mixed-reality/guides/calling-annotations >>, Apr. 3, 2023, 6 pages.

"Dynamics 365 Remote Assist capabilities", retrieved from << https://dynamics.microsoft.com/en-us/mixed-reality/ remote-assist/capabilities/ >>, no later than Oct. 1, 2023, 7 pages.

"Augmented reality", retrieved from << https://en.wikipedia.org/wiki/Augmented_reality >>, Oct. 16, 2023, 48 pages.

"Mixed reality", retrieved from << https://en.wikipedia.org/wiki/Mixed_reality >>, Oct. 15, 2023, 14 pages.

"Windows Mixed Reality", retrieved from << https://en.wikipedia.org/wiki/Windows_Mixed_Reality >>, May 18, 2023, 4 pages.

"Microsoft HoloLens", retrieved from << https://en.wikipedia.org/wiki/Microsoft_HoloLens >>, Oct. 14, 2023, 12 pages.

* cited by examiner

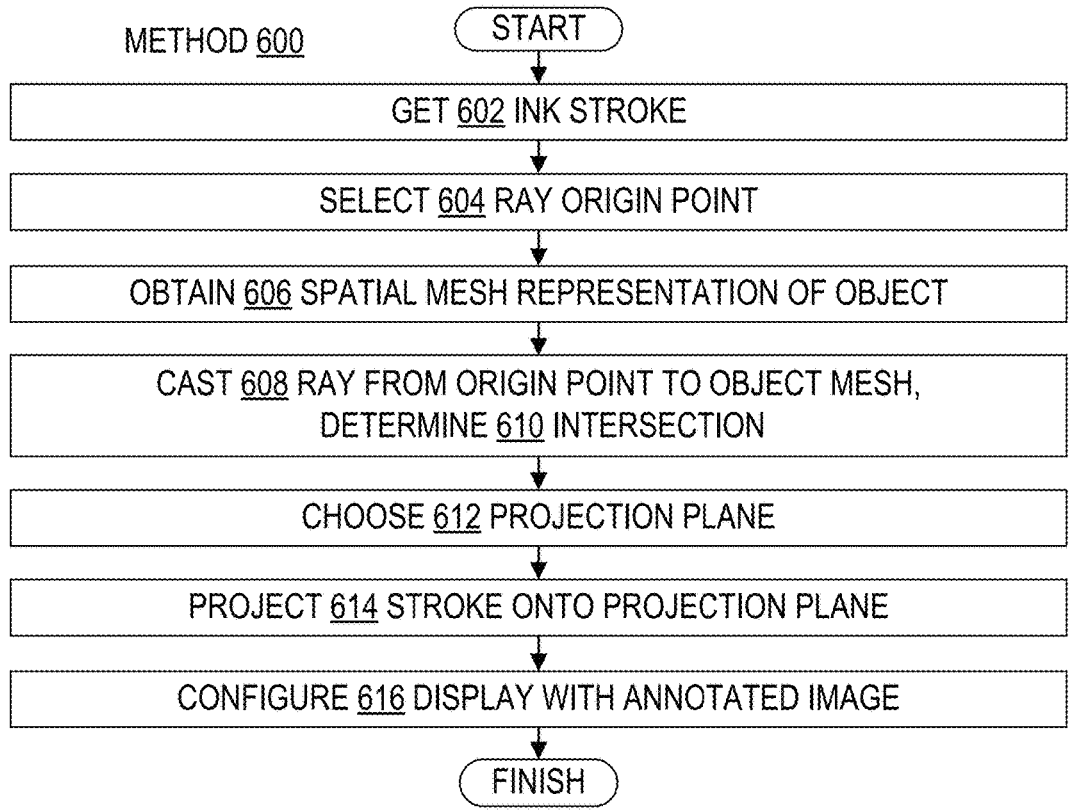

INKING A MIXED REALITY IMAGE

BACKGROUND

Mixed reality images combine real-world imagery such as photographs or video of actual people, actual places, or actual things, with computer-generated imagery such as overlaid text, graphics, or animation. Augmented reality is an example of mixed reality that combines real and virtual worlds for real-time interactions. Mixed reality technologies continue to undergo changes, but improvements are still possible.

SUMMARY

Some embodiments address technical challenges arising from a remote assistance technology in which a remote user attempts to draw annotations on images seen by a person wearing a headset. Efforts to match the annotations to the reality seen in the headset have not been uniformly successful, due in part to the different perspectives involved.

Some embodiments get an ink stroke which includes multiple points in a screen space, select a ray origin point based on at least samples of the ink stroke points, obtain a spatial mesh representation of at least a portion of an object which is at least partially shown in a mixed reality image, cast a ray from the ray origin point to the spatial mesh representation, thereby determining a ray-mesh intersection point, choose a projection plane, project the ink stroke onto the projection plane, and configure a display with the mixed reality image including the projected ink stroke.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. Subject matter scope is defined with claims as properly understood, and to the extent this Summary conflicts with the claims, the claims should prevail.

BRIEF DESCRIPTION OF THE DRAWINGS

A more particular description will be given with reference to the attached drawings. These drawings only illustrate selected aspects and thus do not fully determine coverage or scope.

FIG. 5 is a block diagram illustrating some aspects of mixed reality inking;

FIG. 6 is a flowchart illustrating steps in a mixed reality inking method;

DETAILED DESCRIPTION

Overview

Figure 1:
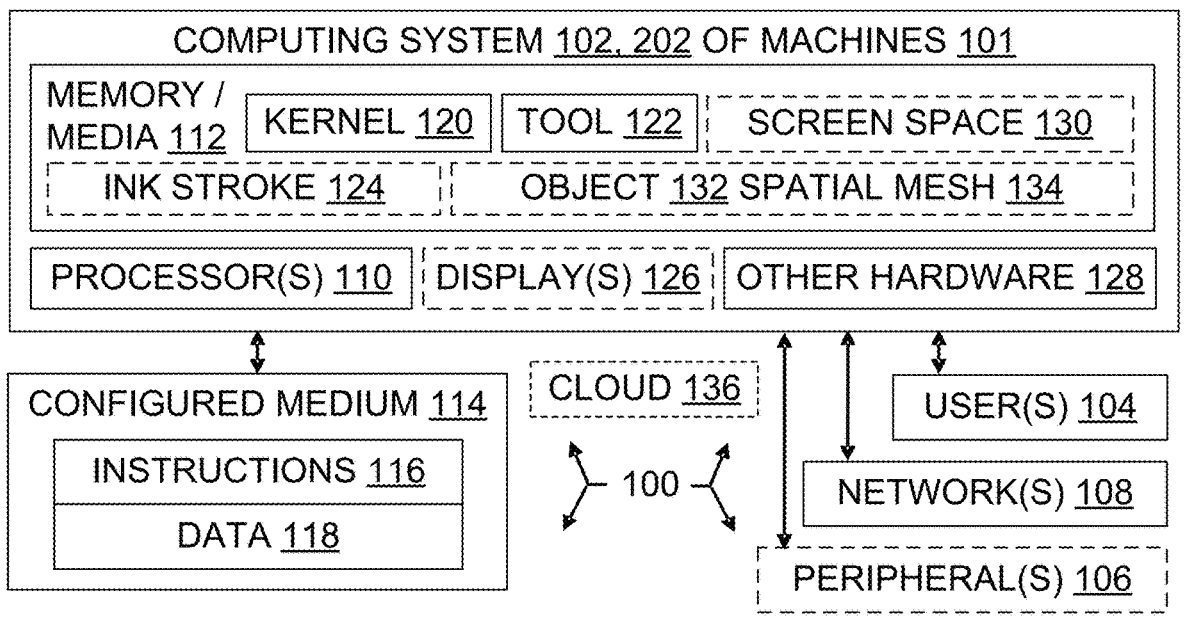
FIG. 1 is a diagram illustrating aspects of computer systems and also illustrating configured storage media, including some aspects generally suitable for systems which provide mixed reality inking functionality.

Some teachings described herein were motivated by technical challenges faced during efforts to improve technology for remote assistance technology. In particular, challenges were faced during efforts to improve Microsoft Mixed Reality solutions. These challenges were motivations, but teachings herein are not limited in their scope or applicability to the particular motivational challenges.

A feature of some mixed reality products is that a remote viewer on a personal computer (PC) or phone is able see from the perspective of a user wearing a headset, and able to draw annotations that will appear in the headset user's space. A challenge here is that the remote user is drawing on a two-dimensional (2D) view of the headset user's world and the 2D ink strokes that the remote user draws should be coherently projected into the 3D space of the headset user. For example, if an annotation follows an object outline or points at an object part from the remote user's perspective, then the annotation should also follow that object outline or point at that object part in the headset user's world, even after the headset user's point of view changes.

One approach to such annotation is to project the annotation's strokes over a spatial mesh that is scanned by the headset. However, there are many practical scenarios where this approach causes incoherent results, such as scenarios containing views of complex machinery or cluttered workspaces which cause the spatial mesh to contain noisy, irregular surfaces.

A better solution provided in some embodiments described herein is to sample a collection of points from the spatial mesh and use a statistical method to approximate a plane onto which the drawing is projected. To do this, a single ray is cast onto the spatial mesh from the remote user's perspective, from the average position of the points of their drawing. At this point of intersection, a radius of interest is calculated proportionate to the size of the annotation when it is projected at that point. Vertices of the spatial mesh that lie within this radius are collected and used to perform a weighted principal component analysis.

Principal component analysis is a statistical method that produces three orthogonal vectors that best approximate the shape of the mesh in that radius along with the weighted average of the points. The plane formed by the two largest principal component vectors (or equivalently, the plane with a normal vector in the direction of the smallest principal component) will represent the flattest direction of the shape sampled. This plane is an optimal choice for a drawing plane unless its angle is too oblique to the viewer, in which case some embodiments compromise by picking a plane in the least oblique of the two remaining principal components. Some embodiments position this plane at the weighted average point calculated earlier and project the drawing onto that plane. The result is a 2D drawing positioned in a 3D space in an orientation that approximates the surface it surrounds.

Additionally, this plane can be retained from one stroke to the next when the drawing contains multiple strokes. The decision to reuse a plane instead of calculating a new one is made based on both the time between strokes and their proximity on the remote user's screen. For example, a pause of several seconds between strokes begins a new drawing and calculates a new plane. Strokes that intersect or meet at their endpoints on the remote user's screen should also intersect or meet in the mixed reality world and so reuse the previously calculated plane.

By contrast, projecting the drawing directly onto the spatial mesh can produce confusing and incoherent results in some scenarios. If the surface is cluttered, such as a tool shelf or work bench with many complexly-shaped items, the stroke will appear bumpy instead of flat and may make confusing detours over objects or into surface cavities, unless enhancements taught herein are utilized. If the subject being annotated is not itself intersected, for example if the user circles around an object without drawing over it, then the stroke will land on surrounding geometry rather than the object in question. This could cause a dramatically incoherent result such as the stroke being projected onto a far wall of a workspace or onto entirely unrelated objects.

Choosing a drawing plane without capturing and analyzing multiple surface points, for example by performing a single ray cast onto the spatial mesh at the point where the stroke begins, also has drawbacks in similar scenarios. If the surface is cluttered, such as a tool shelf or work bench with many complexly-shaped items, the point and normal vector of the plane chosen could point in a dramatically different direction than the overall shape of the surface, due to a local irregularity. If the same stroke was drawn at a different starting point, then it could have a different orientation. If the subject being annotated is not itself intersected, for example if the user circles around an object without drawing over it, then the drawing plane will be chosen from the surrounding geometry rather than the object in question. This could be a point very distant from the object in question such as the far wall of the room or some unrelated nearby object that was intersected when the stroke began.

With the aid of teachings herein, a remote user of an embodiment will have good reason to be confident that annotations the user places will appear as intended to a headset operator. This reliable coherency relieves the remote user and the headset operator of the burden of having the remote user verbally or otherwise manually confirm with the headset operator where each annotation appears from the headset operator perspective; each manual confirmation breaks their workflows and weakens their ability to efficiently rely on accurate annotations.

Some embodiments described herein get an ink stroke which includes multiple points in a screen space, select a ray origin point based on at least samples of the ink stroke points, obtain a spatial mesh representation of at least a portion of an object which is at least partially shown in the mixed reality image, cast a ray from the ray origin point to the spatial mesh representation, thereby determining a ray-mesh intersection point, choose a projection plane, project the ink stroke onto the projection plane, and configure the display with the mixed reality image including the projected ink stroke. This has the technical benefit of improving the consistency and coherency of annotations when they are viewed from a different perspective than the perspective in which they were created.

Some embodiments establish that a largest components plane which is formed by the two largest principal component vectors has a normal vector which is too oblique to a viewer's gaze vector according to an obliqueness threshold, in that an angle between the normal vector of the largest components plane and the viewer's gaze vector exceeds the obliqueness threshold. Then they choose a different plane as the projection plane. This has the technical benefit of improving the coherency of annotations by placing them, when possible, on a plane that is closer to the relative perspective in which they were created rather than further from that perspective.

Some embodiments recognize that a viewer's gaze vector is directed at empty space other than being directed at the object, and choose as the projection plane a plane which is perpendicular to the viewer's gaze vector. This has the technical benefit of improving the coherency of annotations by avoiding pinning them to a distant wall or another location distant from an object of interest.

These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 136. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface by using displays 126, keyboards 106, headsets 526, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface supports interaction between an embodiment and one or more human users. In some embodiments, the user interface includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 136 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include security tools or software applications, on mobile devices 102 or workstations 102 or servers 102, editors, compilers, debuggers and other software development tools, as well as APIs, browsers, or webpages and the corresponding software for protocols such as HTTPS, for example. Files, APIs, endpoints, and other resources may be accessed by an account or set of accounts, user 104 or group of users 104, IP address or group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory nor a computer-readable storage device is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: chiplets, hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUS, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, mixed reality image inking functionality 204 could be installed on an air gapped network and then be updated periodically or on occasion using removable media 114, or not updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current disclosure.

In any later application that claims priority to the current application, reference numerals may be added to designate items disclosed in the current application. Such items may include, e.g., software, hardware, steps, processes, systems, functionalities, mechanisms, data structures, computational resources, programming languages, tools, workflows, or algorithm implementations, or other items in a computing environment, which are disclosed herein but not associated with a particular reference numeral herein. Corresponding drawings may also be added.

More About Systems

Figure 2:
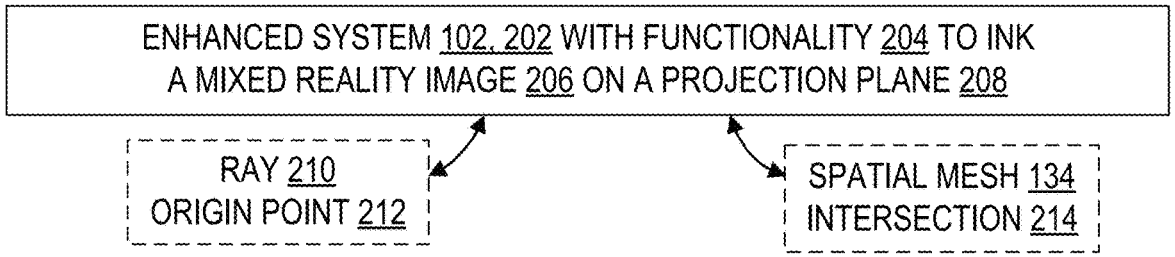
FIG. 2 is a block diagram illustrating aspects of a family of enhanced systems which are each configured with mixed reality inking functionality.

FIG. 2 illustrates a computing system 102 configured by one or more of the mixed reality image inking functionality enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

Figure 3:
FIG. 3 is a snapshot illustrating an attempt to outline an irregularly shaped object with an annotation by using ink projected onto a spatial mesh of the object.
Figure 4:
FIG. 4 is a snapshot of the FIG. 3 annotation attempt, illustrating that the annotation is not coherent when viewed at an angle different from the angle at which it was originally drawn.

FIGS. 3 and 4 illustrate incoherency. They are not a comprehensive catalog or summary of all aspects of annotation coherency.

FIG. 5 shows some aspects of mixed reality image inking 500. This is not a comprehensive summary of all aspects of mixed reality image inking. FIG. 5 items are discussed at various points herein, and additional details regarding them are provided in the discussion of a List of Reference Numerals later in this disclosure document.

The other figures are also relevant to systems 202. FIGS. 6 through 14 illustrate methods of functionality 204 operation, data structures, and computational results, in systems 202.

In some embodiments, the enhanced system 202 is networked through an interface. In some, an interface includes hardware such as network interface cards, software such as network stacks, APIs, or sockets, combination items such as network connections, or a combination thereof.

Some embodiments include a computing system 202 which is configured to ink a mixed reality image 206. The computing system includes: a display 126, a digital memory 112, and a processor set 110 including at least one processor, the processor set in operable communication with the digital memory. The system 202 is configured to, upon execution by the processor set, get 602 an annotation 524 which includes multiple points 502 in a screen space 130, select 604 a ray origin point 212 based on at least samples 508 of the annotation 524 points, obtain 606 a spatial mesh representation 134 of at least a portion of an object 132 which is at least partially shown in the mixed reality image, cast 608 a ray from the ray origin point to the spatial mesh representation, thereby determining 610 a ray-mesh intersection point 214, choose 612 a projection plane 208, project 614 the annotation 524 onto the projection plane, and configure 616 the display with the mixed reality image including the projected annotation 524.

In some embodiments, the annotation includes an ink stroke, and the ink stroke is represented in the computing system at least in part as a Catmull-Rom spline data structure 534, 536 which implements a Catmull-Rom spline 534.

In some embodiments, the annotation includes an ink stroke, and the ink stroke is represented in the computing system at least in part as a data structure 536 which implements a Frenet frame 546.

In some embodiments, the annotation includes an ink stroke, and the ink stroke is represented in the computing system at least in part as a Catmull-Rom spline data structure 534, 536 which implements a Catmull-Rom spline 534.

Some embodiments include a computing system 202 which is configured to ink a mixed reality image 206. The computing system includes: a display 126, a digital memory 112, and a processor set 110 including at least one processor, the processor set in operable communication with the digital memory. The system 202 is configured to, upon execution by the processor set, get 602 an ink stroke 124 which includes multiple points 502 in a screen space 130, select 604 a ray origin point 212 based on at least samples 508 of the ink stroke points, obtain 606 a spatial mesh representation 134 of at least a portion of an object 132 which is at least partially shown in the mixed reality image, cast 608 a ray from the ray origin point to the spatial mesh representation, thereby determining 610 a ray-mesh intersection point 214, choose 612 a projection plane 208, project 614 the ink stroke onto the projection plane, and configure 616 the display with the mixed reality image including the projected ink stroke.

In some embodiments, the ink stroke is represented in the computing system at least in part as a Catmull-Rom spline data structure 534, 536 which implements a Catmull-Rom spline 534.

In some embodiments, a Catmull-Rom spline data structure is part of a class definition which defines a Catmull-Rom spline class 540 in a software program 538, and the Catmull-Rom spline data structure holds Catmull-Rom spline control points in an array 542 in a portion of the digital memory which is memory managed by the Catmull-Rom spline class.

In some embodiments, the ink stroke is represented in the computing system at least in part as a data structure 536 which implements a Frenet frame 546.

In some embodiments, the projected ink stroke or annotation is represented visually in the computing system display 126 at least in part as a set of rendered cylinders 548.

Other system embodiments are also described herein, either directly or derivable as system versions of described processes or configured media, duly informed by the extensive discussion herein of computing hardware.

Although specific mixed reality image inking architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of mixed reality image inking functionality, for example, as well as different technical features, aspects, mechanisms, software, expressions, operational sequences, commands, data structures, programming environments, execution environments, environment or system characteristics, or other functionality consistent with teachings provided herein, and may otherwise depart from the particular examples provided.

Processes (a.k.a. Methods)

Figure 7:
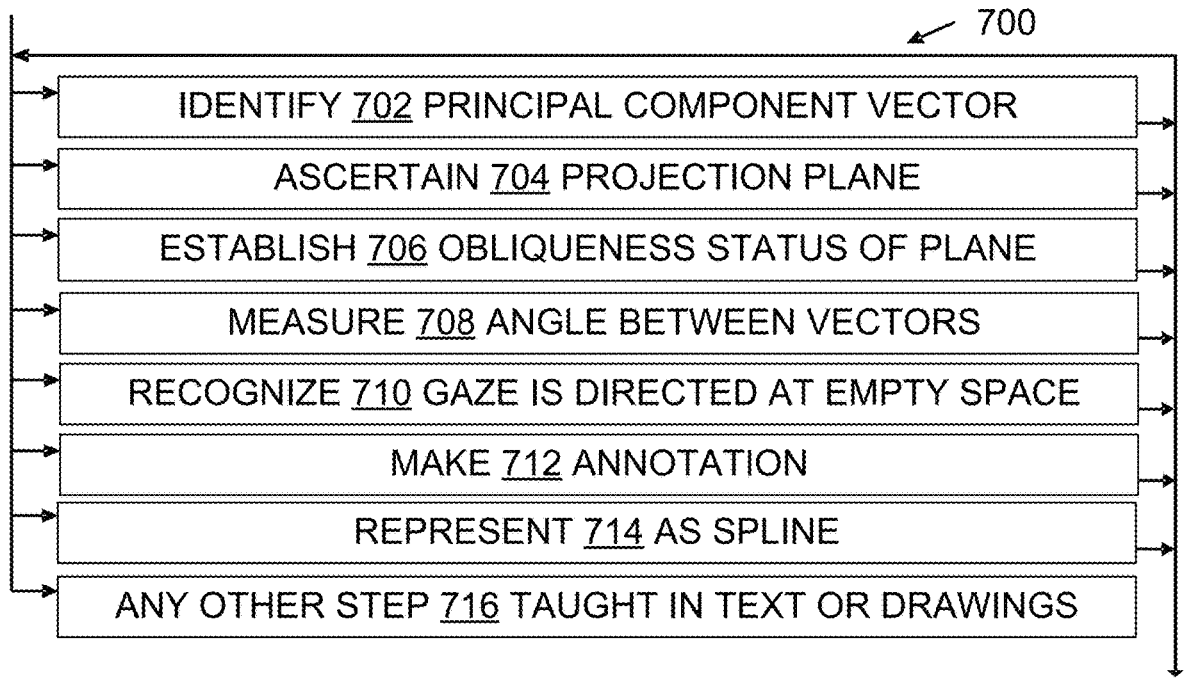
FIG. 7 is a flowchart further illustrating steps in some mixed reality inking methods, and incorporating FIG. 6.

Processes (which are also be referred to as "methods" in the legal sense of that word) are illustrated in various ways herein, both in text and in drawing figures. FIGS. 6 and 7 each illustrate a family of methods 600 and 700 respectively, which are performed or assisted by some enhanced systems, such as some systems 202 or another mixed reality image inking functionality enhanced system as taught herein. Method family 600 is a proper subset of method family 700.

FIGS. 1 to 14 illustrate mixed reality image inking system 202 architectures with implicit or explicit actions, e.g., processing data 118 in which the data 118 includes, e.g., ink stroke 124, spatial mesh 134, ray 210, projection plane 208, splines 532, renderings such as cylinders 548, ribbons 550, and particle streams 552, spaces 130, 518, 528, vectors 510, 512, 522, frames 546, and other data structures 536, among other examples disclosed herein.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some situations a human 104 guides a fingertip or a pen along a display 126 surface, which is captured in the system 202 as a set of points 502. Regardless, no process contemplated as an embodiment herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 7. FIG. 7 is a supplement to the textual examples of embodiments provided herein and the textual descriptions of embodiments provided herein. In the event of any alleged inconsistency, lack of clarity, or excessive breadth due to an aspect or interpretation of FIG. 7, the text of this disclosure shall prevail over that aspect or interpretation of FIG. 7.

Arrows in process or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 700 action items are traversed to indicate the steps performed during a process may vary from one performance instance of the process to another performance instance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 7 to be non-operable, the sequence S is not within the scope of any claim. Any assertion otherwise is contrary to the present disclosure.

Some embodiments provide or utilize a method 700 of inking a mixed reality image, the method performed by a computing system 202. In this discussion and generally elsewhere herein, "method" is used in the legal sense and "process" is used in the computer science sense. The method includes automatically at least: getting 602 an ink stroke which includes multiple points in a screen space; selecting 604 a ray origin point based on at least samples of the ink stroke points; obtaining 606 a spatial mesh representation of at least a portion of an object which is at least partially shown in the mixed reality image; casting 608 a ray from the ray origin point to the spatial mesh representation, thereby determining 610 a ray-mesh intersection point; choosing 612 a projection plane; and projecting 614 the ink stroke onto the projection plane.

In some embodiments, casting 608 casts the ray based on a perspective projection matrix 506 of a camera 504.

In some embodiments, choosing 612 the projection plane includes: identifying 702 principal component vectors based on a region around the ray-mesh intersection point; and ascertaining 704 the projection plane based on at least one of the principal component vectors.

In some embodiments, the principal component vectors include two largest principal component vectors, and ascertaining 704 the projection plane includes: establishing 706 that a largest components plane which is formed by the two largest principal component vectors has a normal vector 522 which is too oblique to a viewer's gaze vector 512 according to an obliqueness threshold 516, in that an angle 514 between the normal vector of the largest components plane and the viewer's gaze vector exceeds the obliqueness threshold; measuring 708 respective angles between the viewer's gaze vector and normal vectors of planes which are formed by respective pairs of principal component vectors other than the two largest principal component vectors; and choosing 612 as the projection plane a plane which has a normal vector that makes the smallest measured angle with the viewer's gaze vector. In some embodiments, the obliqueness threshold 516 is at least sixty degrees, and in some it equals sixty degrees.

In some embodiments, the principal component vectors 510 include a smallest principal component vector, an intermediate principal component vector, and a largest principal component vector, and ascertaining the projection plane includes at least one of: choosing 612 as the projection plane a plane 520 which contains the smallest principal component vector and the intermediate principal component vector; or choosing 612 as the projection plane a plane 520 which contains the smallest principal component vector and the largest principal component vector.

In some embodiments, the principal component vectors 510 include two largest principal component vectors, and ascertaining 704 the projection plane includes: establishing 706 that a largest components plane which is formed by the two largest principal component vectors has a normal vector which is too oblique to a viewer's gaze vector according to an obliqueness threshold, in that an angle between the normal vector of the largest components plane and the viewer's gaze vector exceeds the obliqueness threshold; and choosing 612 as the projection plane a plane which contains two of the principal component vectors and which has a normal vector that makes an angle with the viewer's gaze vector that is not larger than the respective normal vector of any other plane that contains two of the principal component vectors.

In some embodiments, choosing 612 the projection plane includes choosing as the projection plane a plane normal to a surface of the object at the ray-mesh intersection point.

In some embodiments, choosing 612 the projection plane includes: recognizing 710 that a viewer's gaze vector is directed at empty space other than being directed at the object; and choosing 612 as the projection plane a plane which is perpendicular to the viewer's gaze vector.

In some embodiments, getting 602 the ink stroke includes getting ink stroke data in a remote viewer space 518; selecting 604 the ray origin point includes selecting the ray origin point in a headset user space 528 which differs in perspective from the remote viewer space; and the method makes 712 an ink stroke annotation 524, which is drawn in the remote viewer space, appear in the headset user space.

In some embodiments, getting 602 the ink stroke includes getting ink stroke data in a remote viewer space 518; selecting 604 the ray origin point includes selecting the ray origin point in a mixed reality user space which differs in perspective from the remote viewer space; and the method makes 712 an ink stroke annotation, which is drawn in the remote viewer space, appear in the mixed reality user space.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as mixed reality image inking software 204, ink strokes 124, and spatial meshes 134, in the form of data 118 and instructions 116, read from a removable storage medium 114 and/or another source such as a network connection, to form a configured storage medium. The configured storage medium 112 is capable of causing a computer system 202 to perform technical process steps for providing or utilizing mixed reality image inking functionality 204 as disclosed herein. The Figures thus help illustrate configured storage media embodiments and process (a.k.a. method) embodiments, as well as system and process embodiments. In particular, any of the method steps illustrated in FIG. 6 or 7, or otherwise taught herein, may be used to help configure a storage medium to form a configured storage medium embodiment.

Some embodiments use or provide a computer-readable storage device 112, 114 configured with data 118 and instructions 116 which upon execution by a processor 110 cause a computing system 202 to perform a mixed reality image inking method 700. This method 700 includes: getting 602 an ink stroke which includes multiple points in a screen space; selecting 604 a ray origin point based on at least samples of the ink stroke points; obtaining 606 a spatial mesh representation of at least a portion of an object which is at least partially shown in the mixed reality image; casting 608 a ray from the ray origin point to the spatial mesh representation, thereby determining 610 a ray-mesh intersection point; choosing 612 a projection plane; projecting 614 the ink stroke onto the projection plane; and rendering 616 the mixed reality image, including the projected ink stroke, on a display device.

In some embodiments, the method begins projecting 614 the ink stroke onto the projection plane within one hundred milliseconds after getting 602 at least two ink stroke sample points.

In some embodiments, the ink stroke is represented 714 in the computing system at least in part as a Bezier spline data structure which implements a Bezier spline 544.

In some embodiments, the projected ink stroke is represented visually 616 in the computing system display at least in part as at least one of: a ribbon 550, or a particle stream 552.

Additional Observations

Additional support for the discussion of mixed reality image inking functionality 204 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, best mode, novelty, nonobviousness, inventive step, or industrial applicability. Any apparent conflict with any other patent disclosure, even from the owner of the present subject matter, has no role in interpreting the claims presented in this patent disclosure. With this understanding, which pertains to all parts of the present disclosure, examples and observations are offered herein.

Several approaches are possible for annotating a mixed reality image. Some approaches either smooth or plane-fit a spatial mesh which represents real objects in the image, but approaches taught herein provide better results. For example, projecting a "shrink-wrap" mesh from the perspective of the camera and limiting changes in depth would require a large number of ray casts and is not likely to perform correctly on distant objects. Plane-fitting the spatial mesh can produce good results on plane-like objects such as a wall or shelves, but not on complex objects. Plane-fitting the spatial mesh also requires a thorough preprocessing scan and delay while planes are calculated.

Some approaches implement cubic Bézier splines in either three-dimensional space or four-dimensional homogeneous space and some of these include options for working in non-Euclidian spaces. However, some of the approaches that implement cubic Bezier splines employ a best-fit algorithm that sometimes consumes time and other resources during recursions before converging, and some tend to over-smooth the results. Some do not implement any method for orienting 3D geometry along the spline, such as a Frenet frame. Some approaches rely on the normal vectors of the geometry being drawn on, which is unsuitable for direct inking. Also, in some approaches ink strokes are drawn as flat ribbons, which is acceptable for drawing on surfaces but not optimal in empty space.

With regard to choosing 612 a drawing plane 208, some embodiments choose a single drawing plane for remote inking instead of separately projecting each point involved in the stroke. To choose an appropriate plane, some embodiments cast a ray onto a spatial mesh 134 only once, after a stroke 124 has been completely entered. In a screen space 130, some embodiments compute the average of all points sampled during the ink stroke and then cast 608 a ray from this average center point 212.

Figure 11:
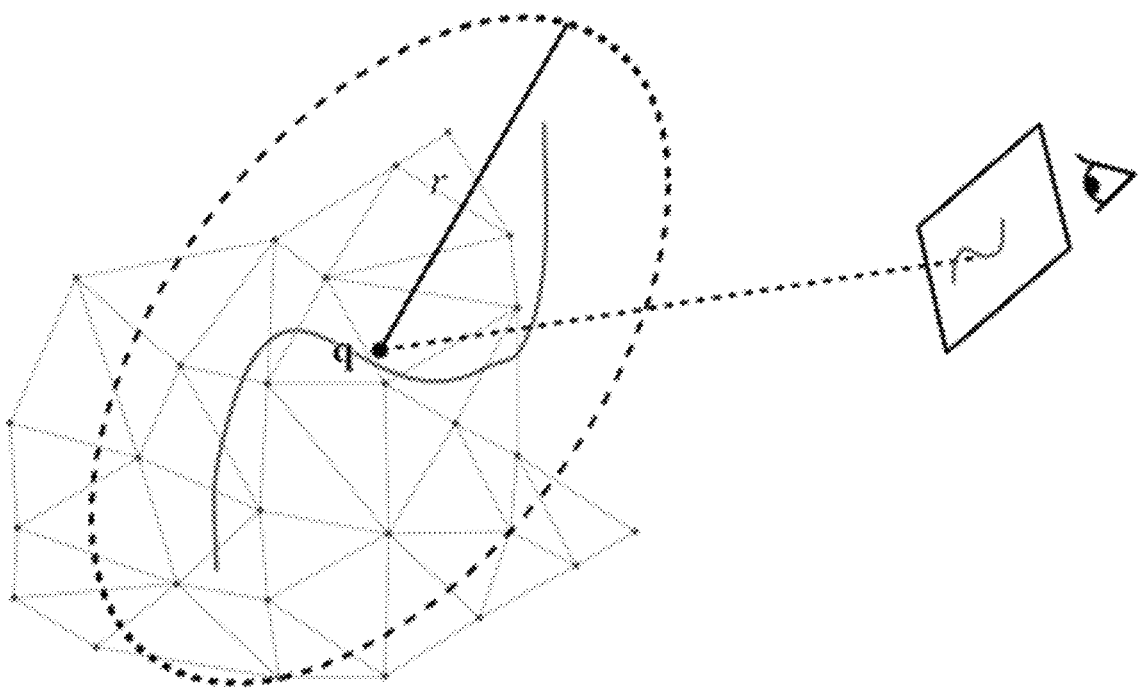
FIG. 11 is a diagram illustrating mixed reality inking in which a ray is cast from the center of a stroke onto a spatial mesh which the ray intersects at point q, a radius of interest r is established by projecting the stroke at a depth where the intersection occurred, and the radius is chosen to be larger than the stroke to aid sampling.

As illustrated in FIG. 11, a ray is cast from the center of the stroke onto the spatial mesh and intersects at point q. A radius of interest, r, is established by projecting the stroke at the depth where the intersection occurred. The radius is chosen to be slightly larger than the stroke for good sampling, e.g., chosen to extend beyond each endpoint of the stroke by an amount in the range of 5% to 20% of the linear distance between the two endpoints of the stroke.

If the ray intersects the spatial mesh, one approach is to simply take the point and normal vector of the intersection to establish a drawing plane. However, because the spatial mesh can be particularly noisy when complex objects are involved, this would produce unpredictable results. To obtain a more stable normal vector, some embodiments perform a weighted principal component 510 analysis at the point of intersection 214 with a radius of influence proportional to the size of the annotation projected at the depth of the intersection as illustrated in FIG. 12.

Figure 12:
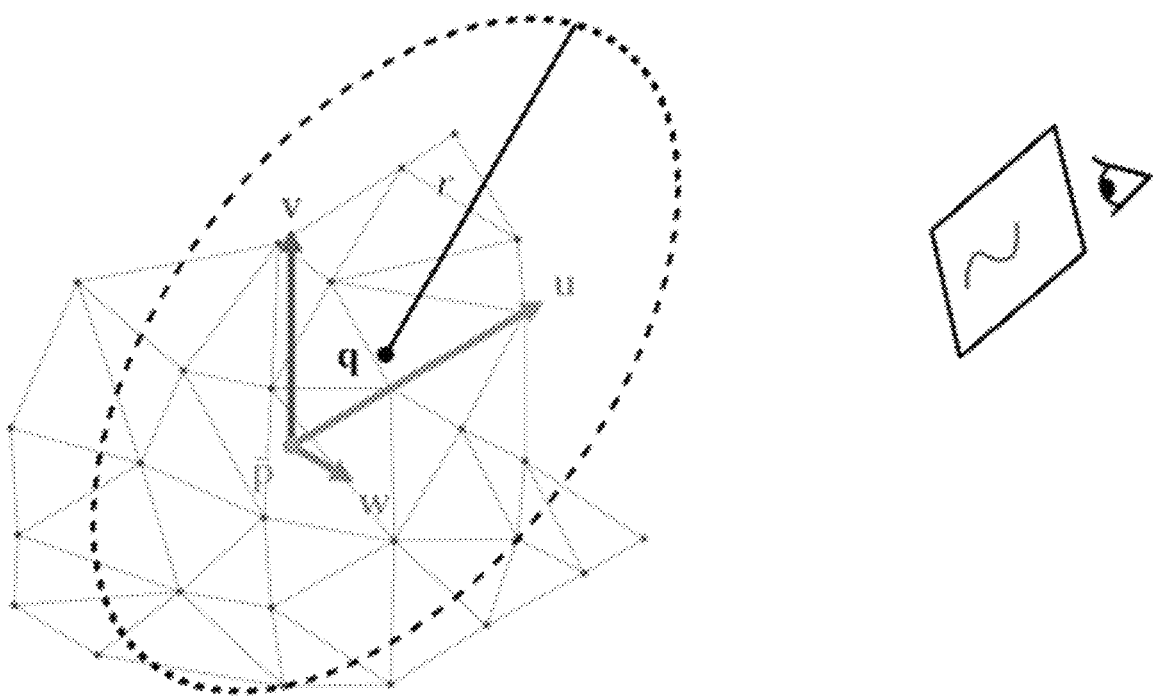
FIG. 12 is a diagram showing results of a weighted principal component analysis made at a region of interest, with principal components being u, v, and w in order of greatest magnitude to least, in which a weighted mean of the points sampled, $\bar{p}$, is also evaluated, and illustrating a case in which $\bar{p}$ is offset from q.

FIG. 12 shows the results of a weighted principal component analysis made at the region of interest enclosed by a dashed line perimeter in FIG. 11. The principal components are u, v, and w in order of greatest magnitude to least. The weighted mean of the points sampled, $\bar{p}$, is also evaluated. Notice that p may be offset from q.

Figure 13:
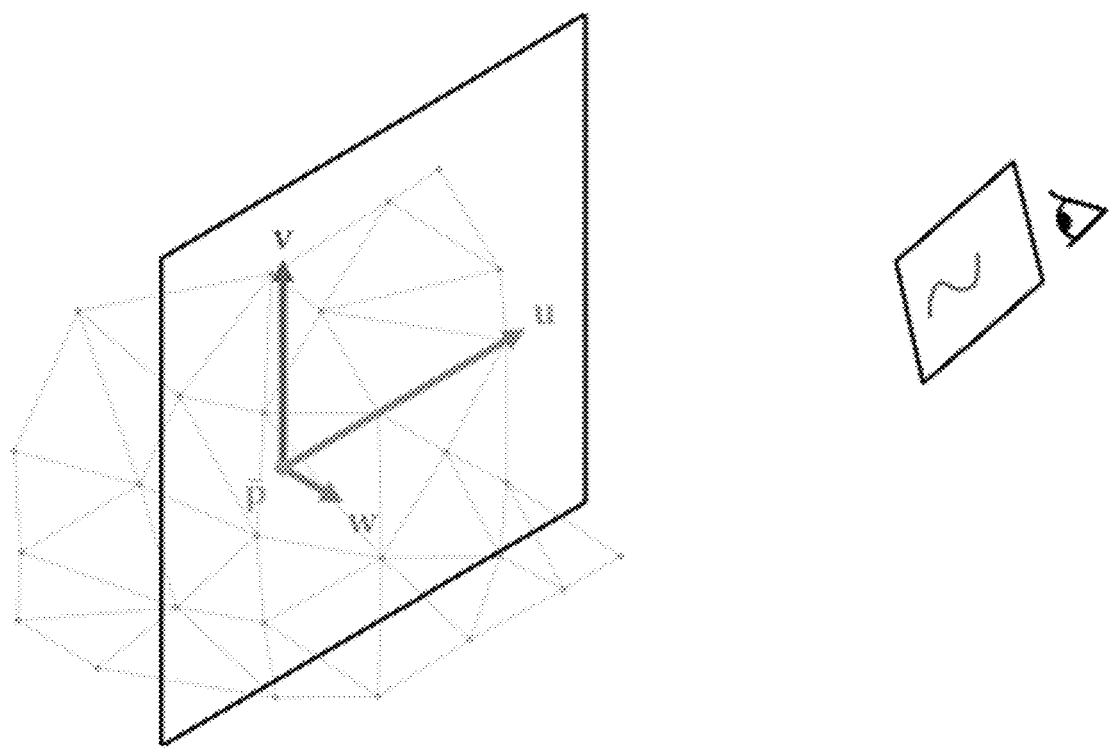
FIG. 13 is a diagram illustrating a case in which the two largest principal components u and v define a drawing plane with a normal vector in the direction of the smallest component w, and in which the plane is centered on the weighted mean $\bar{p}$.

Generally, the result of this analysis will be three principal component vectors, u, v, and w as illustrated in the particular example of FIG. 12. These vectors 510 are candidates for the normal vector of the drawing plane 208. The smallest of these components, w, represents the flattest component of surface in the region of interest and is usually the best choice, as is shown in FIG. 13, unless it is at an extremely oblique angle to the viewer, in which case the least oblique of u and v is a better choice. In an edge case in which there are too few points to perform this principal component analysis (which an embodiment will detect if any of the principal components are zero or within a specified epsilon of zero), then some embodiments use the point and normal where the original ray intersected the mesh.

FIG. 13 shows an example in which the two largest principal components, u and v, define a drawing plane with a normal vector in the direction of the smallest component w. The plane is centered on the weighted mean $\bar{p}$.

Figure 14:
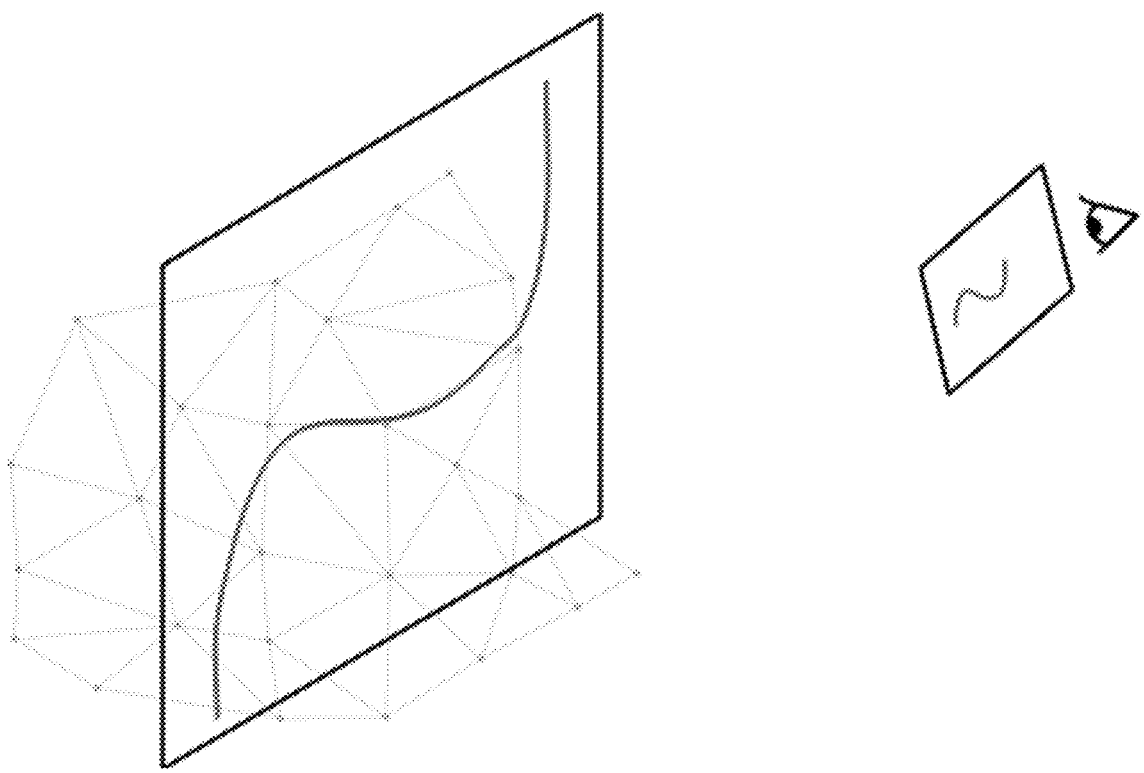
FIG. 14 is a diagram showing the stroke of FIG. 11 projected onto the plane calculated as shown in FIGS. 12 and 13.

Because this principal components calculation cannot be made until the stroke is completed, a consequence of this approach is that a headset user does not see the stroke while it is being drawn. Some embodiments collect received screen points 502 in a cache, and await a stop inking or similar event, before continuing with the ray cast, the principal components calculation, and the projection into the headset user's space, as shown in the example of FIG. 14.

With regard to math utilities, some embodiments include or utilize software code which upon execution in a computing system perform one or more math functions.

One example math utility routine is ComputePrincipalComponents( ), which performs a principal component analysis of the given points and returns the three resulting axes 510. One implementation includes:

```
static Matrix4x4 ComputePrincipalComponents(
    ReadOnlySpan<Vector3> points);
```

The parameter points is a collection of points to analyze. The routine returns a transformation matrix whose columns contain the principal components in descending order of magnitude. The fourth (translation) column contains the average of the points. The analysis is linear with respect to the number of points. It performs two passes over the collection. Its memory usage is constant and insignificant in terms of overall resource consumption.

Another example math utility routine is ComputeLocalPrincipalComponents( ), which performs a weighted principal component analysis of the given points in a particular a region of interest. One implementation includes:

```
static Matrix4x4 ComputeLocalPrincipalComponents(
    ReadOnlySpan<Vector3> points,
    Vector3 pointOfInterest,
    float radiusOfInterest);
```

The parameter points is a collection of points to analyze. The parameter pointOfInterest is the center of a region of interest in the point cloud; points closer to this center will have greater influence on the result. The parameter radiusOfInterest is the extent of the region of interest in the point cloud; points beyond this distance will have no influence on the result.

The routine returns a transformation matrix whose columns contain the weighted principal components in descending order of magnitude. The fourth (translation) column contains the weighted average of the points. The analysis is linear with respect to the number of points. It performs two passes over the collection. Its memory usage is constant and insignificant in terms of overall resource consumption.

Another example math utility routine is Eigenvectors( ). This routine computes the eigenvalues and eigenvectors of a 3×3 matrix. In a computing environment which does not support a 3×3 matrix as such, a 3×3 portion of a larger matrix is used. One implementation includes:

```
static (Vector3 V0, Vector3 V1, Vector3 V2) Eigenvectors(
    this Matrix3x3 m);
```

The parameter m is the matrix to evaluate, the translation column of which is discarded. The routine returns up to three eigenvectors whose magnitudes are equal to their corresponding eigenvalues. The vectors are returned in ascending order of magnitude. Some or all these vectors may be zero if the matrix has fewer than three real eigenvalues. Because a 3×3 matrix has a characteristic polynomial that is cubic, there is a closed-form solution that can be calculated in constant time.

Another example math utility routine is Wyvill( ). This routine evaluates the Wyvill field function, which is used as a weighting function by ComputeLocalPrincipalComponents( ). The Wyvill function for radius r and displacement vector d is given by:

$$w_r(d) = \begin{cases} 1 - \frac{4\|d\|^6}{9r^6} + \frac{17\|d\|^4}{9r^4} - \frac{22\|d\|^2}{9r^2}, & \|d\| < r \\ 0, & \|d\| \geq r \end{cases}$$

This function has the nice property that it can be treated as a cubic polynomial over $\|d\|^2$, eliminating the square root involved in calculating $\|d\|$. One implementation includes:

```
static float Wyvill(
    Vector3 origin,
    float radius,
    Vector3 point);
static float Wyvill(
    float radius,
    Vector3 displacement);
```

The parameter origin is the center of the field's influence. The parameter radius is the radius of the field's influence. The parameter point is the point being tested. The parameter displacement is the displacement vector from the center of the field.

If the distance between point and origin (or, alternately, the magnitude of displacement) is within radius then a value between 1 and 0 is returned, this value decreases with a high degree of continuity as the distance increases. If the point or displacement lies outside the field's radius, then 0 is returned. This is a polynomial calculation and can be evaluated in constant time.

Some additional math utilities or data structures support the CatmullRomSpline class in some embodiments. Polynomial2, Polynomial3, and Polynomial4 structures represent linear, quadratic, and cubic polynomials with scalar coefficients. Each has an Evaluate( ), Differentiate( ), and Solve( ) method (these polynomials can all be solved with a closed formula). A generic Polynomial structure represents higher-degree polynomials. Unlike the lower-degree polynomials, some Solve( ) methods herein utilize a numerical search (Newton's algorithm) and rely on search boundaries. Similar VectorPolynomial2, VectorPolynomial3, VectorPolynomial4, and VectorPolynomial structures implement the same methods for polynomials with vector coefficients. A MotionVectors structure holds Position, Velocity, Acceleration, and Jolt vectors (position and its first, second, and third derivatives) for use together. It also computes Curvature, Torsion, and Radius scalars from the provided values, on demand.

In some scenarios, tuning is performed using a testbed to compare the results of different parameters (such as the sampling radius) side by side. Testing is also employed in some scenarios to obtain user experience telemetry suitable for guiding optimizations, e.g., how long users spend in an annotation mode, how long different types of annotation persist in the user's world, the typical length and volume covered by ink drawings, the distribution of distances at which remote expert annotations are made, how many retries are made when creating a stroke, and the typical amount of time remote experts spend creating an individual stroke from pen down to pen up.

A Remote Expert is a user on a PC or phone or other device remote from a headset user (e.g., a Hololens® user) who can assist the headset user during a video call or other electronic interactive communication by observing their environment and placing annotations in images of that environment, resulting in mixed reality images. For present purposes, "remote" means at least one of the following holds: (a) the remote user cannot see directly in the real world the object of interest but instead sees an electronic image of the object, (b) the remote user and the headset user are physically separated from one another by a protective physical barrier such as a radiation containment, a bacterial hazard containment, an atmospheric containment, a temperature containment, a pressure containment, or another physical hazard containment barrier, or (c) the remote user and the headset are physically separated by at least ten meters. In some scenarios, the remote user and the headset operator are both remote from the headset, and the headset is a remotely controlled virtual headset device, e.g., a remotely controlled physical robot or a remotely controlled physical drone.

With regard to performance, the time to perform Weighted PCA increases linearly with respect to the number of points in the mesh. In some embodiments, the algorithm is accelerated by adding a broad phase to eliminate some points outside the region of interest. However, in some embodiments spatial meshes provided are already broken into cubic chunks of a fixed size to allow for large maps. The analysis need not complete synchronously and in some embodiments is performed on a background thread or over multiple frames.

Because the stroke rendering is deferred until all points are received, an optimization in some embodiments is to send the points in large batches instead of streaming them one at a time.

In some embodiments, a headset user will see ink annotations only once they are completed, not while they are being drawn. However, this is handled entirely on the headset device.

Teachings presented herein have been prototyped, including a solution for placing annotations with direct touch in addition to hand rays. Among other aspects, the prototype replaces a C++ Bézier spline plugin with a C# Catmull-Rom implementation supporting splines created in empty space.

A spline is a kind of curve specified by a sequence of Control Points. A complete spline includes individual Segments which are each defined by polynomial functions and influenced by a subsequence of the control points (cubic polynomials influenced by four points are typical). A Catmull-Rom spline is a particular type of cubic spline that is useful for interpolating a sequence of points. A Bézier spline is a type of spline that is useful for creating precisely controlled curves. A Frenet frame (also known as a Frenet-Serret apparatus) is an artifact or method for orienting objects along the path of a spline.

A Remote Expert is a user operating a PC or mobile device who views a video feed of a headset user. Remote Experts can place annotations on the video feed that are then projected into the headset user's space.

Direct (Interaction) refers to an interaction or manipulation on the headset that is directly controlled by the user's hands. This is also called a "near-field" interaction.

Indirect (Interaction) refers to an interaction or manipulation that is performed at distance though some extension of the user's hands, such as hand rays or gaze and gesture interactions.

Figure 8:
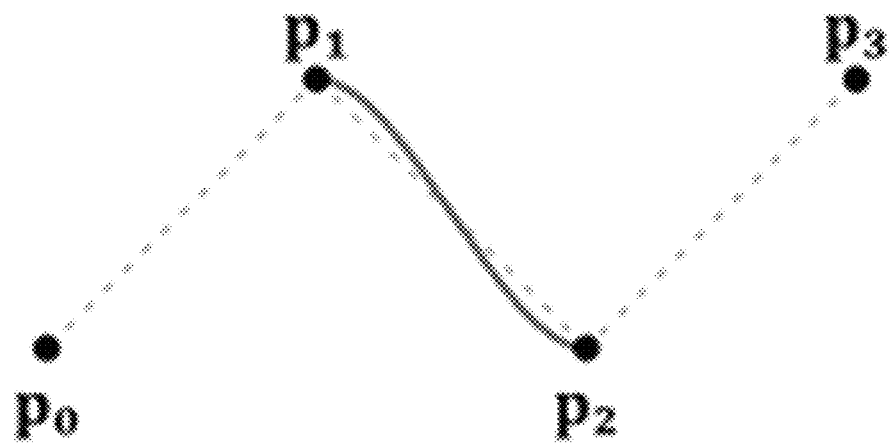
FIG. 8 is a diagram illustrating an individual Catmull-Rom segment.
Figure 9:
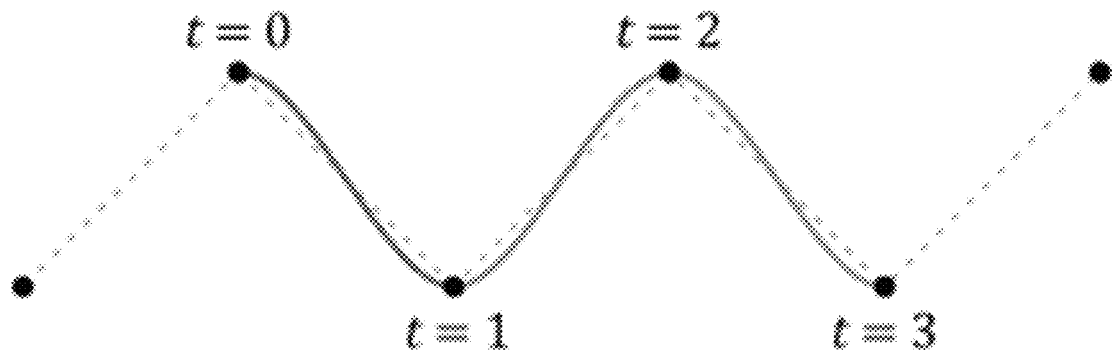
FIG. 9 is a diagram illustrating a Catmull-Rom spline constructed from multiple overlapping segments.

With respect to spline implementation, some embodiments utilize a Catmull-Rom spline library written in C#, or another procedural programming language. Catmull-Rom splines are cubic curves where each segment is defined by four control points. The curve will interpolate the second and third control points while the first and fourth points define the tangents at the endpoints, as illustrated in FIG. 8. An advantage of Catmull-Rom splines is that if an embodiment has a long sequence of control points, the embodiment can create a spline that smoothly interpolates all but the first and last point by creating a four-point window and moving it by one point at a time as illustrated in FIG. 9.

How closely a Catmull-Rom spline interpolates its control mesh is determined by a parametrization value between 0 and 1. For example, a centripetal parametrization value of 0.5 will interpolate the control mesh sufficiently closely without overshooting and creating problematic geometry, in some embodiments.

Catmull-Rom splines are well-suited for inking in 3D space because an embodiment can sample a trail of points left by a user's gesture and interpolate them without relying on a secondary best-fit algorithm (contrary to an approach using Bézier splines). Some drawbacks of Catmull-Rom splines compared to Bézier splines are that velocity is not strictly continuous at control points (it is however geometrically continuous) and that the Catmull-Rom spline curve is not bounded by the convex hull of its control points (a property that can accelerate intersection algorithms with Bézier curves).

Since the first and last points are not interpolated, some embodiments add two virtual control points to either end of the collection actually sampled and compute their locations.

Some embodiments include or invoke a Catmull-RomSpline class with the following characteristics.

The CatmullRomSpline class provides methods for specifying control points by implementing IList<Vector3> with control points specified in order from first to last. This allows clients to use consistent and convenient C# idioms for controlling the spline.

The CatmullRomSpline class internally manages its list of control points as an array, which it will resize as called for. This allows it to internally use efficient constructions such as Span<Vector3> to represent individual segments and avoid heap allocation. Like a List<Vector3>, this array will at least double in length if its capacity is exceeded and overallocation can freed by a TrimExcess( ) method. The class exposes an opaque hint struct that caches calculations which can be reused from one evaluation to the next. This hint structure is an optional parameter in all cases and will be disregarded if changes to the spline have invalidated it.

The CatmullRomSpline class allows creation of an Interpolator, which lets clients visit points along the curve similarly to an Enumerator visiting items in a collection. In particular, the Interpolator provides: (a) The position, velocity, acceleration, and jolt at its current point on the curve. (b) A transformation matrix at its current point called a Frenet Frame. This frame will remain stable even when crossing a point of inflection and is useful for placing objects or constructing a mesh along the curve. (c) An Increment( ) method that moves along curve by a variable amount, chosen to add detail in high curvature areas while taking larger steps in areas where the curve is straighter.

The CatmullRomSpline class provides implementations of the following algorithms: Split( ), SubSpline( ), and FindClosestPoint( ). Split( ) and SubSpline( ) are both far simpler in the Catmull-Rom implementation than in some Bézier implementations, whereas FindClosestPoint( ) is the same algorithm in either case. Some embodiments implement a suitable EstimateClosestPoint( ) method by finding the closest point on the line segments connecting the spline's control points and interpolating (an approach that does not work with Bézier splines).

Since Enumerators, Interpolators, and Hints may all be inadvertently retained after the Catmull-Rom spline's control points are modified, the Catmull-Rom spline in some embodiments also maintains a modification token to prevent their accidental use.

In some embodiments, the Catmull-Rom spline will raise error conditions as exceptions, as opposed to returning zero or NaN to signal an incorrect configuration. In practice, code that uses the Catmull-Rom class optimally takes steps not to use the class in invalid ways such as not providing sufficient control points or providing coincident control points. Some exceptions are: (a) SplineDomainException (extends ArgumentOutOfRangeException) if an attempt is made to evaluate the spline at a t value less than zero or greater than its domain (which is three less than the number of control points). (b) SplineIncompleteException (extends InvalidOperationException) if an attempt is made to evaluate the spline before at least four control points have been added. (c) SplineModifiedException (extends InvalidOperationException) if an Interpolator or Enumerator is used after changes are made to the source spline. (d) CoincidentControlPointsException (extends InvalidOperationException) if, while evaluating the spline, two adjacent control points are found that share the same position. Coincident control points create singularities that would otherwise pollute the output with NaN and Infinity values.

As an example usage, some embodiments manipulate a spline's control points following the interface of an IList<Vector3>:

```
var spline = new CatmullRomSpline(100); // Initial capacity of 100 control points
spline.Add(Vector3.zero);
spline.AddRange(new Vector3[ ] { /* ... */ });
spline.Insert(1, Vector3.one);
spline[2] = Vector3.up;
spline.RemoveAt(3);
// etc...
```

Some embodiments evaluate the spline or its derivatives at a particular instant, using EvaluatePosition( ), EvaluateVelocity( ), EvaluateAcceleration( ), or EvaluateJolt( ):

```
var point = spline.EvalutePosition(2.0f);
var tangent = Vector3.Normalize(spline.EvaluteVeloctity(2.0f));
// etc...
```

Some embodiments use Evaluate( ) to get all four vectors at once:

```
var vectors = spline.Evalute(2.0f);
var point = vectors.Position;
var tangent = Vector3.Normalize(vectors.Velocity);
// etc...
```

Some embodiments use the Hint structure to accelerate repeated calls to Evaluate( ):CatmullRomSpline.Hint hint;

```
var previousPoint = spline.EvaluatePosition(0, ref hint);
for (float t = 0.1f; t <= spline.Domain; t += 0.1f)
{
    var currentPoint = spline.EvaluatePosition(t, ref hint);
    Debug.DrawLine(previousPoint, currentPoint);
    previousPoint = currentPoint;
}
```

Some embodiments use an Interpolator to place objects along the spline in an efficient and stable manner (note that the Interpolator itself maintains the Hint in this case):

```
   var i = spline.GetInterpolator( );
   var vertices = new List<Vector3>( );
   while (i.Increment( )) // Same pattern as IEnumerator.MoveNext( )
   {
      Debug.Assert(i.Frame.IsValidTRS( )) // Always succeeds
      // Place a marker object and make it face along the curve
      var marker = Instantiate(/* ... */);
      marker.transform.position = i.Position;
      marker.transform.rotation = i.Frame.rotation;
      // Plot some vertices (e.g. for loading into a mesh)
      vertices.Add(i.Frame.TransformPoint(Vector3.left * 0.05f));
      vertices.Add(i.Frame.TransformPoint(Vector3.right * 0.05f));
```

Some embodiments include optimizations to avoid possible performance problems. In some, the CatmullRomSpline class internally uses a plain array to hold control points and makes heavy use of Span and ReadOnlySpan to avoid spurious heap allocations and memory copies. That is, the CatmullRomSpline class itself manages the memory that hold the points, rather than delegating memory management to, for example, a C# List<T> class. In some embodiments, the CatmullRomSpline class offers methods to cache intermediate calculations that can be reused from one evaluation to the next such as Hint and Interpolator. In some embodiments, the CatmullRomSpline class uses value types instead of reference types (e.g., struct instead of class) to avoid accumulating many small allocations on the heap over time.

In some embodiments, annotation software is aware of its memory usage and creates mitigations to avoid excessively using memory and jeopardizing the stability of any application that includes the annotation software. To avoid such crashes some annotation software creates a memory budget to manage and maintain its footprint. When annotations reach 90% memory utilization, the annotation software displays a short banner (similar to poor network quality) indicating that the user is about to hit max annotations memory allocation. The banner prompts users to clear previously placed annotations to avoid hitting memory limits. When a user has exhausted their annotations memory limit this example annotation software displays a banner, notifying the user it has hit their max memory limit and old annotations must be cleared before proceeding. The annotations toolbar is greyed out to provide visual feedback to the user indicating memory limit for annotation has been reached.

Some embodiments use cylinders instead of ribbons, so the total number of vertices in a stroke data structure will increase. This will impact both memory and speed. However, because some embodiments still obtain good results with a very coarse cylinder, and because the load is fairly low, this use of cylinders is unlikely to have a significant adverse performance impact.

In some embodiments using a particular architecture discussed here as a non-exclusive example, a flow of ink annotations occurs and events transfer data between a Mixed Reality (MR) Stage and an Activity layer. In the MR Stage, points 502 are sampled from hand ray interaction or direct hand interaction. An ink annotation drawing controller (hardware and software) detects start events and end events, and notifies the Activity layer via Stage Events such as StartInking, ContinueInking, and StopInking. Video communications mechanisms in the Activity layer manage annotations from multiple sources and provide undo and redo capabilities. Remote expert ink annotations are fed to the video communications mechanisms. View State sent from the Activity layer to the MR Stage arrives at Ink Annotation Components in an Annotation Context. Each Ink Annotation Component manages a single ink stroke 124, obtaining an ink stroke segment and sending it to a spline renderer, for each of one or more ink stroke segments.

In this example architecture, an InkAnnotation DrawingController class responds to input events and samples points from hand gestures. It transfers point samples to the TeamsCallActivity via stage events. Under a different approach, it also transferred normal vectors from surface collisions. However, in embodiments using a spline system with Frenet frames for orientation, these normal vectors are no longer necessary.

In this example architecture, the TeamsCallActivity component manages annotations at a high level, from both local and remote sources and handles the undo/redo stack. Since both the spline renderer and input system are aspects of the MR Stage, the TeamsCallActivity is largely unchanged by switching from Bezier splines to Catmull-Rom splines, apart from the removal of normal vectors from the stage events.

In this example architecture, the InkAnnotationComponent is an MR State Component, responsible for displaying ink annotations. It receives points from the TeamsCallActivity and creates InkStrokeSegment game objects with SplineRenderer components. To avoid the expense of performing large meshes, the strokes are broken into separate segments each with its own SplineRenderer.

In this example architecture, the SplineRenderer component works with a MeshRenderer component to discretize a spline as a triangle mesh. The related InkStrokeSegment component works with the InkAnnotationComponent to update control points on the SplineRenderer.

Figure 10:
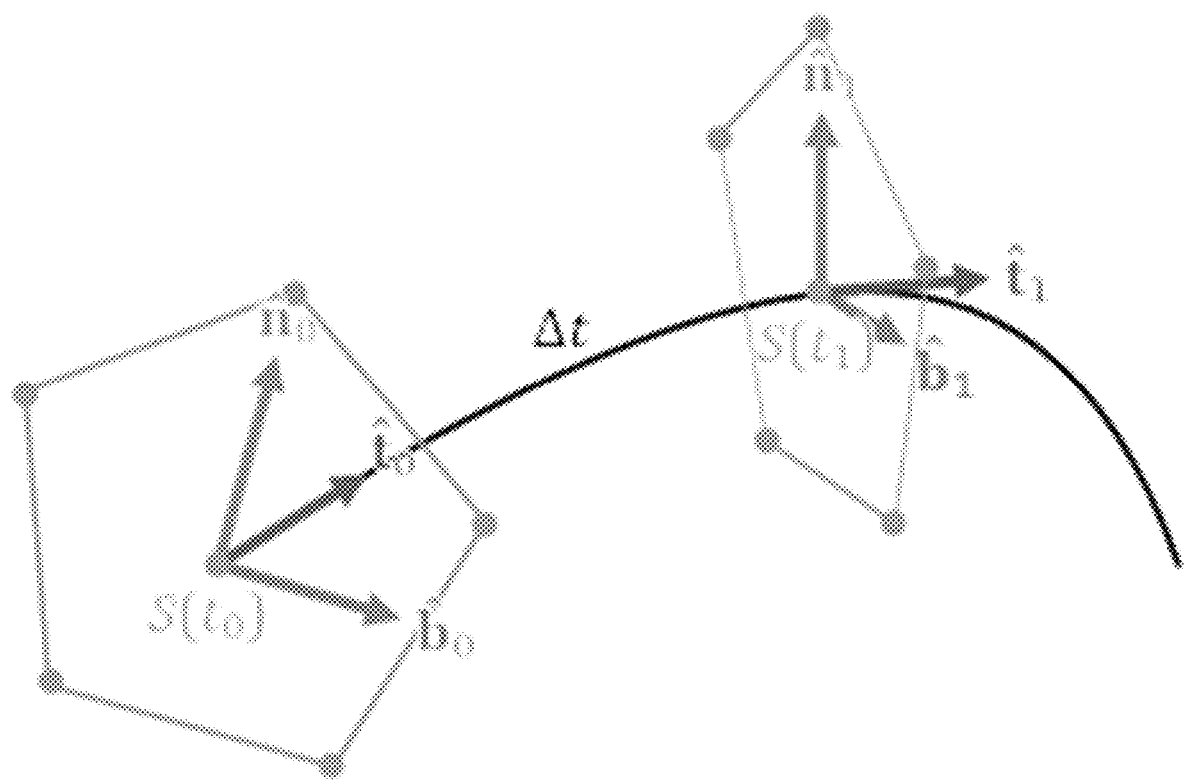
FIG. 10 is a diagram illustrating vertices placed around Frenet frames on a spline.

To render a spline using the class described, an embodiment obtains an Interpolator and begins stepping along the spline. At each step, embodiment uses the interpolator's Frame property to place a circle of vertices in the plane formed by the curve's normal and binormal vectors. Since strokes are reasonably thin and plainly shaded, the number of vertices placed at each step can be as few as five. The embodiment creates triangles connecting the current circle of vertices to the previous step's circle. This is illustrated in FIG. 10. The value. At is computed by the interpolator's Increment( ) method, which attempts to find an optimal value.

This approach creates cylindrical meshes, but other geometries such as ribbons or particle systems (a.k.a. particle streams) are created in a similar manner.

Some embodiments address a problem which arises from projection of 2D annotations or strokes made by remote user or expert over a spatial mesh scanned by a mixed reality headset; the projection often produces confusing and incoherent results. This occurs especially in scenarios where the scene has complex machinery or cluttered workspaces that causes spatial mesh to contain noisy or irregular surfaces. Such results are also obtained if the annotated subject is itself intersected, when the stroke will land on surrounding geometry rather than the object in question.

In some embodiments, a projection method addresses the problem of mapping 2D annotations into 3D spatial mesh. The solution considers a collection of points from the spatial mesh and uses a weighted PCA technique over it to approximate a plane onto which the drawing is then projected.

In some embodiments, a method of inking a mixed reality image includes computationally: (a) getting an ink stroke which includes multiple points in a screen space; (b) selecting a ray origin point based on at least samples of the ink stroke points; (c) obtaining a spatial mesh representation of an object which is at least partially shown in the mixed reality image (some headsets construct a spatial mesh for the headset user's entire surroundings, so the sampling is not strictly limited to objects in the mixed reality image, though it tend to not extend far outside it); (d) casting a ray from the ray origin point to the spatial mesh representation, in a direction normal to the screen space, thereby determining a ray-mesh intersection point (the ray is cast using the camera's perspective projection matrix, not the normal of the camera plane); (e) identifying principal component vectors based on a region around the ray-mesh intersection point; (f) ascertaining a projection plane based on at least one of the principal component vectors; and (g) projecting the ink stroke onto the projection plane.

In some scenarios, when the plane formed by the two largest principal component vectors is too oblique to the viewer, some embodiments pick a plane in the least oblique of the two remaining principal components. The plane formed by the two largest principal components has a normal vector in the direction of the smallest component. To measure obliqueness, some embodiments look at the angle between this normal vector and the direction of the viewer's gaze. If this angle is above a configurable threshold, some embodiments conclude that plane is too oblique and select a different plane. To select a new plane, some embodiments look at the two remaining principal components and measure their angles with the viewer's gaze. The vector that makes the smallest angle is chosen as the normal vector of the drawing plane. This is not necessarily the plane formed by the two smallest components; it could also be the plane formed by the largest and the smallest.

After experimentation, it was determined that a 60° angle between the viewer's gaze and the plane's normal was a suitable threshold for "too oblique".

In some situations, when a plane was rejected because of its obliqueness, the two remaining principal components tended to be similar in magnitude (for example, a flat wall parallel to the viewer's gaze). In this case, using the orientation that best faces the viewer gives more consistent results than comparing the magnitudes of the two remaining components.

On the topic of edge cases, it is occasionally possible for too few points to be present in the region to perform a principal component analysis. In this case some embodiments use the surface normal at the point of intersection for the plane normal. Finally, if the viewer is looking into empty space, then the ray cast will not intersect anything and some embodiments position the plane perpendicular to the viewer at a fixed default distance.

Weighted Principal Component Analysis

Principal Component Analysis is a statistical method that takes a large collection of points and deduces orthogonal vectors that best represent the directions of greatest variance among the points. In three dimensions, these can be thought of as the radii of an ellipsoid that best approximates the points. Weighted Principal Component Analysis is an extension which considers only a particular region of interest instead of the entire collection. This region is defined by a point of interest q, a radius of interest r, and a weighting function $w_r(d)$ that determines a point's influence on the result given its displacement from q. There are many possible choices of weighting function, with the main requirement being that $w_r(d)$ decreases as $\|d\|$ approaches r. Some embodiments utilize a Wyvill field function, adapted from it use in implicit surface construction:

$$w_r(d) = \begin{cases} 1 - \frac{4\|d\|^6}{9r^6} + \frac{17\|d\|^4}{9r^4} - \frac{22\|d\|^2}{9r^2}, & \|d\| < r \\ 0, & \|d\| \geq r \end{cases}$$

This function has several desirable properties (particularly when compared to the more typical function $$w_r(d) = \frac{r}{\|d\|}):$$

(a) It does not contain asymptotes. (b) It can be evaluated using only the square distance, $\|d\|^2$, which can eliminate a square root operation. (c) It is continuous to the sixth derivative. (d) Its tangents at $\|d\|=0$ and $\|d\|=r$ are zero.

With the Wyvill field function chosen as a suitable weighting function, some embodiments compute the weight each point, $p_i$, contributes to the result, $w_i$, and the net weight of all points, $\Sigma w$, as:

$$w_i = w_r(\|p_i - q\|), \Sigma w = \sum_i w_i$$

This allows to compute a weighted average:

$$\overline{p} = \frac{1}{\Sigma w} \sum_i w_i p_i$$

From which some embodiments compute a covariance matrix. This will be symmetric a 3×3 matrix where each element represents the covariance between the corresponding vector components. It is computed as:

$$C = \frac{1}{\Sigma w} \sum_i w_i (p_i - \overline{p})(p_i - \overline{p})^T$$

Put another way, if $[\Delta x_i, \Delta y_i, \Delta z_i] = p_i - \overline{p}$, then the covariance matrix will be:

$$C = \frac{1}{\Sigma w} \sum_i w_i \begin{bmatrix} \Delta x_i^2 & \Delta x_i \Delta y_i & \Delta x_i \Delta z_i \\ \Delta y_i \Delta x_i & \Delta y_i^2 & \Delta y_i \Delta z_i \\ \Delta z_i \Delta x_i & \Delta z_i \Delta y_i & \Delta z_i^2 \end{bmatrix}$$

Once an embodiment has the covariance matrix, the embodiment computes its eigenvalues and eigenvectors to find the principal components. For a 3×3 covariance matrix, the characteristic polynomial will be:

$$p_C(\lambda) = -\lambda^3 + tr(C)\lambda^2 + \frac{tr(C^2) - tr^2(C)}{2}\lambda + \det(C)$$

where tr(C) denotes the trace of C (the sum of the elements on its diagonal). This is a cubic polynomial and has a closed-form solution. The result is up to three eigenvalues: $\lambda_0$, $\lambda_1$, and $\lambda_2$. If there are fewer than three real solutions to the polynomial, then the points are coplanar or colinear and have thus have fewer than three principal components. To find eigenvectors, $v_0$, $v_1$, and $v_2$ that correspond to these eigenvalues, the embodiment solves the equation $C\lambda_i = v_i \lambda_i$ for $v_i$. By setting the z component of $v_i$ as a free variable, the embodiment arrives at a solution by row-reducing the following matrix using Gaussian elimination:

$$\begin{bmatrix} C_{0,0} - \lambda_i & C_{0,1} & C_{0,2} \\ C_{1,0} & C_{1,1} - \lambda_i & C_{1,2} \\ C_{2,0} & C_{2,1} & C_{2,2} - \lambda_i \end{bmatrix} \begin{bmatrix} 0 \\ 0 \\ 1 \end{bmatrix}$$

Once the left-hand side of this matrix is reduced to the identity matrix, the right-hand side will contain an eigenvector that satisfies $C\lambda_i = v_i\lambda_i$:

$$\begin{bmatrix} 1 & 0 & 0 \\ 0 & 1 & 0 \\ 0 & 0 & 1 \end{bmatrix} \begin{bmatrix} x_i \\ y_i \\ 1 \end{bmatrix}$$

Normalizing the eigenvectors by their corresponding eigenvalues and then sorting in descending order gives the principal components of the original points.

Experimental Results

As further illustration of teachings presented herein, an internal prototype is now discussed. This prototype discussion is illustrative of embodiment teachings, not prescriptive, and varies in implementation details and architecture from some embodiments. This prototype discussion is not intended to be comprehensive, or to stand on its own.

In some scenarios, a remote expert on a PC or phone can draw ink annotations on a still frame of a headset. On the headset, this 2D ink is projected onto the 3D surface mesh in the user's space. However, this mesh is often noisy, particularly on complex machinery, and what appears to be a continuous stroke on the remote expert's screen is sometimes projected at different depths on the headset user's display causing an incoherent result, as illustrated in FIGS. 3 and 4. FIGS. 3 and 4 show an attempt to outline an irregularly shaped object using ink projected onto the spatial mesh. Notice that the annotation is coherent only when viewed from the angle at which it was originally drawn.

To quantify this issue, internal experimenters collected a number of images and surveyed members of an internal team to rank the result when annotations were performed using a legacy approach and when annotations were performed using a prototype constructed in view of teachings presented herein. The images were obtained from efforts to circle or outline several irregularly shaped objects in a simulated workshop environment as a remote expert, and included screenshots of the headset user's perception of the results from multiple viewpoints. Experimenters constructed a survey with these images and asked participants to rate each image as with one of the following qualifiers: (a) Pass (exactly as remote expert intended), (b) Soft Pass (didn't draw accurately but headset operator understood what expert wanted, or (c) Fail (headset operator did not understand what the Remote Expert tried to convey at all, requires Remote-Expert to re-draw ink).

The results of this survey are summarized below. Results are quantized by assigning scores of 2, 1, and 0 respectively to the responses, leading to an overall score representing the quality of ink annotations. The embodiment prototype performed substantially better overall, and yielded more coherent annotations than the legacy approach in six of the seven scenario categories, with a tie in the seventh category.

|  | Legacy Approach | Embodiment Prototype |
| --- | --- | --- |
| Single item, flat wall | 1 | 1.75 |
| Multiple objects, flat wall | 0.875 | 1 |
| Multiple objects, flat desk | 1.625 | 1.75 |
| Single item, complex wall | 0.375 | 1 |
| Complex item, complex surface | 0.25 | 1 |
| Embedded object, complex surface | 0.875 | 1 |
| Small object, complex surface | 0.75 | 0.75 |
| Average | 5.75 | 10.25 |

Internet of Things

In some embodiments, the system 202 is, or includes, an embedded system such as an Internet of Things system. "IoT" or "Internet of Things" means any networked collection of addressable embedded computing or data generation or actuator nodes. An individual node is referred to as an internet of things device 101 or IoT device 101 or internet of things system 102 or IoT system 102. Such nodes are examples of computer systems 102 as defined herein, and may include or be referred to as a "smart" device, "endpoint", "chip", "label", or "tag", for example, and IoT may be referred to as a "cyber-physical system". In the phrase "embedded system" the embedding referred to is the embedding a processor and memory in a device, not the embedding of debug script in source code.

IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage-RAM chips or ROM chips provide the only local memory; (e) no CD or DVD drive; (f) being embedded in a household appliance or household fixture; (g) being embedded in an implanted or wearable medical device; (h) being embedded in a vehicle; (i) being embedded in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

Technical Character

The technical character of embodiments described herein will be apparent to one of ordinary skill in the art, and will also be apparent in several ways to a wide range of attentive readers. Some embodiments address technical activities such as rendering 616 annotations on a display device 126, electronically obtaining 606 a digital spatial mesh data structure 134 which represents one or more real-world objects, and computationally casting 608 a ray as part of generating an annotated mixed reality image 206, which are each an activity deeply rooted in computing technology. Some of the technical mechanisms discussed include, e.g., PCs 101, phones 101, tablets 101, headsets 526, 101, displays 126, and mixed reality image inking functionality 204. Some of the technical effects discussed include, e.g., production of mixed reality image annotations 524 which remain coherent from different headset user perspectives, projection plane 208 choices which are not more oblique to a viewer than a specified configurable obliqueness threshold 516, and improved coherency annotations 524 achieved by avoiding pinning annotations to a distant wall or another location distant from an object of interest. Thus, purely mental processes and activities limited to pen-and-paper are clearly excluded. Other advantages based on the technical characteristics of the teachings will also be apparent to one of skill from the description provided.

One of skill understands that image inking (a.k.a. image annotating) generally is a technical activity which cannot be performed mentally, because it requires creating or changing pixels or other digital visual representation data structures in display 126 memory or other computing system memory 112. As disclosed herein, mixed reality image inking also involves communication of data 118 between devices 101, e.g., a remote user device 101 and a headset 101, 526, which cannot be performed mentally or manually. One of skill also understands that attempting to perform mixed reality image inking manually would create unacceptable delays in program execution, and be contrary to the fundamental goal of providing remote assistance via transmission of images 118 between devices 101. People manifestly lack the speed, accuracy, memory capacity, electronic communication capabilities, and specific computational processing capabilities required to perform mixed reality image inking.

In particular, mixed reality image inking is a part of computing technology. Hence, the mixed reality image inking improvements such as functionality 204 described herein are improvements to computing technology.

Different embodiments provide different technical benefits or other advantages in different circumstances, but one of skill informed by the teachings herein will acknowledge that particular technical advantages will likely follow from particular embodiment features or feature combinations, as noted at various points herein. Any generic or abstract aspects are integrated into a practical application such as a remote assistance solution, e.g., Microsoft Dynamics 365® Guides, which is a mixed-reality application for Microsoft HoloLens® devices that helps headset operators by providing helpful holographic instructions (marks of Microsoft Corporation).

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not.

Rather, the present disclosure is focused on providing appropriately specific embodiments whose technical effects fully or partially solve particular technical problems, such as how to reduce computational resources spent on best-fit algorithm recursions, how to reduce or avoid over-smoothing ink stroke curves, how to improve ink stroke annotation coherency in a remote assistance system, and how to recognize when a viewer's gaze is directed at open space instead of being directed at a particular object. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, tools, peripherals, software process flows, identifiers, repositories, data structures, data selections, naming conventions, notations, control flows, or other implementation choices described herein. Any apparent conflict with any other patent disclosure, even from the owner of the present subject matter, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
LAN: local area network
OS: operating system
PaaS or PAAS: platform-as-a-service
PCA: Principal Component Analysis (a statistical method for calculating axes that approximate a collection of points)
RAM: random access memory
ROM: read only memory
SR: Surface Reconstruction (mesh geometry 134 constructed by a headset device's spatial awareness system)
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Sharing a reference numeral does not mean necessarily sharing every aspect, feature, or limitation of every item referred to using the reference numeral. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin (x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud 136 may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" may also be used as a patent law term of art, e.g., in describing a process claim as opposed to a system claim or an article of manufacture (configured storage medium) claim. Similarly, "method" is used herein primarily as a technical term in the computing science arts (a kind of "routine") but it is also a patent law term of art (akin to a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Mixed reality image inking operations such as ray casting 608, projection plane choosing 612, stroke projecting 614, and many other operations discussed herein (whether recited in the Figures or not), are understood to be inherently digital. A human mind cannot interface directly with a CPU or other processor, or with RAM or other digital storage, to read and write the necessary data to perform the image inking steps 700 taught herein even in a hypothetical or actual prototype situation, much less in an embodiment's real world interactive computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user, and indicates machine activity rather than human activity. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this disclosure discusses various data values and data structures, and recognize that such items reside in a memory (RAM, disk, etc.), thereby configuring the memory. One of skill will also recognize that this disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as ascertaining, casting, choosing, configuring, establishing, getting, identifying, inking, making, measuring, obtaining, projecting, recognizing, receiving, representing, sampling, selecting, sending, transforming (and ascertains, ascertained, casts, cast, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest. Example verbs listed here may overlap in meaning or even be synonyms; separate verb names do not dictate separate functionality in every case.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other storage device or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory and computer readable storage devices are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe aspects of embodiments by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102
101 machine in a system 102, e.g., any device having at least a processor 110 and a memory 112 and also having a distinct identifier such as an IP address or a MAC (media access control) address; may be a physical machine or be a virtual machine implemented on physical hardware
102 computer system, also referred to as a "computational system" or "computing system", and when in a network may be referred to as a "node"
104 users, e.g., user of an enhanced system 202
106 peripheral device
108 network generally, including, e.g., LANs, WANs, software-defined networks, clouds, and other wired or wireless networks
110 processor or set of processors; includes hardware
112 computer-readable storage medium, e.g., RAM, hard disks
114 removable configured computer-readable storage medium
116 instructions executable with processor; may be on removable storage media or in other memory (volatile or nonvolatile or both)
118 digital data in a system 102; data structures, values, source code, and other examples are discussed herein 120 kernel(s), e.g., operating system(s), BIOS, UEFI, device drivers; also refers to an execution engine such as a language runtime
122 software tools, software applications, security controls; computational
124 ink stroke, as represented in a computing system
126 display screens, also referred to as "displays"
128 computing hardware not otherwise associated with a reference number 106, 108, 110, 112, 114
130 screen space ("space" in the computer graphics computational sense), as represented in a computing system
132 real world object, also refers to representation in a computing system of a real world object
134 spatial mesh representation in a computing system of real world objects' surfaces
136 cloud, also referred to as cloud environment or cloud computing environment
202 enhanced computing system, i.e., system 102 enhanced with functionality 204 as taught herein
204 mixed reality image inking functionality, also referred to as image annotating functionality 204, e.g., software or specialized hardware which performs or is configured to perform steps 602 through 614, or steps 604 through 616, or any software or hardware which performs or is configured to perform a novel method 700 or a computational image inking functionality activity first disclosed herein
206 mixed reality image, as represented in a computing system
208 projection plane, as represented in a computing system
210 computer graphics ray (for computation—not necessarily displayed or visible), as represented in a computing system
212 computer graphics ray origin point (for computation—not necessarily displayed or visible), as represented in a computing system
214 intersection point between mesh 134 and ray 210 (for computation—not necessarily displayed or visible), as represented in a computing system
500 computational inking operations, as represented or performed in a computing system
502 point of an ink stroke, as represented in a computing system
504 camera (for computation—not necessarily physical), as represented in a computing system
506 camera perspective matrix, as represented in a computing system
508 computational activity of sampling, or a result thereof, as represented in a computing system
510 principal component vector (for computation—not necessarily displayed or visible), as represented in a computing system
512 viewer gaze vector (for computation—not necessarily displayed or visible), as represented in a computing system
514 angle between vectors (for computation—not necessarily displayed or visible), as represented in a computing system
516 obliqueness threshold, as represented in a computing system
518 remote viewer space ("space" in the computer graphics computational sense), as represented in a computing system
520 plane (for computation—not necessarily displayed or visible), as represented in a computing system
522 normal vector (for computation—not necessarily displayed or visible), as represented in a computing system
524 annotation, e.g., ink stroke, computer-generated text or diagram, as represented in a computing system
526 headset device; as defined herein, in some embodiments a "headset" includes a physical device suitable to be worn on a human user's head, but in some embodiments the "headset" is virtual in the sense that the physical device portion of the "headset" is a remotely controlled robot or a remotely controlled drone which is not suitable to be worn on a human user's head
528 headset user (a.k.a. headset operator) space ("space" in the computer graphics computational sense), as represented in a computing system
530 Catmull-Rom characteristic of a spline or spline generation or manipulation software, as opposed for example to Bezier characteristic, as represented in a computing system
532 spline, as represented in a computing system
534 Catmull-Rom spline data structure in a computing system
536 data structure in a computing system
538 software program in a computing system
540 class in a program 538
542 array in a program 538
544 Bezier spline in a computing system
546 Frenet frame (for computation—not necessarily displayed or visible), as represented in a computing system
548 cylinder data structure or visualization, as part or all of a stroke 124 in a computing system
550 ribbon data structure or visualization, as part or all of a stroke 124 in a computing system
552 particle stream data structure or visualization, as part or all of a stroke 124 in a computing system
554 any item discussed in the present disclosure that has not been assigned some other reference numeral; 554 may thus be shown expressly as a reference numeral for various items, and may be added as a reference numeral (in the current disclosure or any subsequent patent application which claims priority to the current disclosure) for various items without thereby adding new matter
600 flowchart; 700 also refers to image inking methods that are illustrated by or consistent with the FIG. 6 flowchart or any variation of the FIG. 6 flowchart described herein
602 computationally get an ink stroke or other annotation, e.g., via an API
604 computationally select a ray origin point
606 computationally obtain a mesh 134, e.g., via direct computation of at least a portion of the mesh or via an API
608 computationally cast a ray
610 computationally determine an intersection
612 computationally choose a projection plane
614 computationally project at least a portion of a stroke or other annotation onto a projection plane
616 computationally configure a display 126, e.g., by rendering at least a portion of a stroke onto a screen of the display
700 flowchart; 700 also refers to image inking methods that are illustrated by or consistent with the FIG. 7 flowchart, which incorporates the FIG. 6 flowchart and other steps taught herein, or methods that are illustrated by or consistent with any variation of the FIG. 7 flowchart described herein

702 computationally identify a principal component vector

704 computationally ascertain a projection plane

706 computationally establish an obliqueness status (e.g., angle relative to a viewer) of a plane

708 computationally measure an angle between vectors, e.g., using dot product

710 computationally recognize that a gaze is not directed at a particular object, e.g., other than a wall or a table surface

712 computationally make an annotation, e.g., based on user gestures indicating an ink stroke, or typing

714 computationally represent a curve as a spline in a computing system

716 any step discussed in the present disclosure that has not been assigned some other reference numeral; 716 may thus be shown expressly as a reference numeral for various steps, and may be added as a reference numeral (in the current disclosure or any subsequent patent application which claims priority to the current disclosure) for various steps without thereby adding new matter

CONCLUSION

Mixed reality images 206 are inked 500 with strokes 124 and other annotations 524, permitting a headset 526, robot 526, or drone 526 operator to see coherent graphical additions made by a remote user. Some embodiments get 602 an ink stroke 124 in an annotation which includes multiple points 502 in a screen space 130, select 604 a ray origin point 212 based on at least samples 508 of the annotation points, obtain 606 a spatial mesh representation 134 of at least a portion of an object 132 which is at least partially shown in a mixed reality image 206, cast 608 a ray 210 from the ray origin point to the spatial mesh representation, thereby determining 610 a ray-mesh intersection point 214, choose 612 a projection plane 208, project 614 the annotation onto the projection plane, and configure 616 a display 126 with the mixed reality image including the projected ink stroke or other annotation.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/ or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; it is not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A method of inking a mixed reality image, the method performed by a computing system, the method comprising automatically:
   getting an ink stroke which includes multiple points in a screen space;
   selecting a ray origin point based on at least samples of the ink stroke points;
   obtaining a spatial mesh representation of at least a portion of an object which is at least partially shown in the mixed reality image;
   casting a ray from the ray origin point to the spatial mesh representation, thereby determining a ray-mesh intersection point;
   choosing a projection plane, the choosing comprising identifying principal component vectors based on a region around the ray-mesh intersection point, and the choosing comprising ascertaining the projection plane based on at least one of the principal component vectors, the principal component vectors comprising a smallest principal component vector, an intermediate principal component vector, and a largest principal component vector, the ascertaining comprising choosing as the projection plane a plane which contains the smallest principal component vector and also contains at least one of the intermediate principal component vector or the largest principal component vector; and
   projecting the ink stroke onto the projection plane.

2. The method of claim 1, wherein casting casts the ray based on a perspective projection matrix of a camera.

3. The method of claim 1, wherein choosing the projection plane comprises choosing as the projection plane a plane normal to a surface of the object at the ray-mesh intersection point.

4. The method of claim 1, wherein choosing the projection plane comprises:
   recognizing that a viewer's gaze vector is directed at empty space other than being directed at the object; and
   choosing as the projection plane a plane which is perpendicular to the viewer's gaze vector.

5. The method of claim 1, wherein:
   getting the ink stroke includes getting ink stroke data in a remote viewer space;
   selecting the ray origin point includes selecting the ray origin point in a headset user space which differs in perspective from the remote viewer space; and
   the method makes an ink stroke annotation, which is drawn in the remote viewer space, appear in the headset user space.

6. The method of claim 1, wherein:
   getting the ink stroke includes getting ink stroke data in a remote viewer space;
   selecting the ray origin point includes selecting the ray origin point in a mixed reality user space which differs in perspective from the remote viewer space; and
   the method makes an ink stroke annotation, which is drawn in the remote viewer space, appear in the mixed reality user space.

7. A computing system which is configured to ink a mixed reality image, the computing system comprising:
 a display;
 a digital memory;
 a processor set comprising at least one processor, the processor set in operable communication with the digital memory;
 wherein the computing system is configured to, upon execution by the processor set, get an annotation which includes multiple points in a screen space, select a ray origin point based on at least sample points of the annotation, obtain a spatial mesh representation of at least a portion of an object which is at least partially shown in the mixed reality image, cast a ray from the ray origin point to the spatial mesh representation, thereby determining a ray-mesh intersection point, choose a projection plane, project the annotation onto the projection plane, and configure the display with the mixed reality image including the projected annotation; and
 wherein at least one of: the annotation comprises an ink stroke which is represented in the computing system at least in part as a data structure which implements a Frenet frame, or the projected annotation comprises an ink stroke which is represented visually in the computing system display at least in part as a set of rendered cylinders.

8. The computing system of claim 7, wherein the annotation comprises an ink stroke, and the ink stroke is represented in the computing system at least in part as a Catmull-Rom spline data structure which implements a Catmull-Rom spline.

9. The computing system of claim 8, wherein the Catmull-Rom spline data structure is part of a class definition which defines a Catmull-Rom spline class in a software program, and the Catmull-Rom spline data structure holds Catmull-Rom spline control points in an array in a portion of the digital memory which is memory managed by the Catmull-Rom spline class.

10. A computer-readable storage device configured with data and instructions which upon execution by a processor cause a computing system to perform a mixed reality image inking method, the method comprising:
 getting an ink stroke which includes multiple points in a screen space;
 selecting a ray origin point based on at least samples of the ink stroke points;
 obtaining a spatial mesh representation of at least a portion of an object which is at least partially shown in the mixed reality image;
 casting a ray from the ray origin point to the spatial mesh representation, thereby determining a ray-mesh intersection point;
 choosing a projection plane, the choosing comprising identifying principal component vectors based on a region around the ray-mesh intersection point, and the choosing comprising ascertaining the projection plane based on at least one of the principal component vectors, the principal component vectors comprising two largest principal component vectors, the ascertaining comprising establishing that a largest components plane which is formed by the two largest principal component vectors has a normal vector which is too oblique to a viewer's gaze vector according to an obliqueness threshold, in that an angle between the normal vector of the largest components plane and the viewer's gaze vector exceeds the obliqueness threshold;
 projecting the ink stroke onto the projection plane; and
 rendering the mixed reality image, including the projected ink stroke, on a display device.

11. The computer-readable storage device of claim 10, wherein the method begins projecting the ink stroke onto the projection plane within one hundred milliseconds after getting at least two ink stroke sample points.

12. The computer-readable storage device of claim 10, wherein the ink stroke is represented in the computing system at least in part as a Bezier spline data structure which implements a Bezier spline.

13. The computer-readable storage device of claim 10, wherein the projected ink stroke is represented visually in the computing system display device at least in part as a particle stream.

14. The computer-readable storage device of claim 10, wherein at least one of: the ink stroke is represented in the computing system at least in part as a data structure which implements a Frenet frame, or the projected ink stroke is represented visually in the computing system display deice at least in part as a set of rendered cylinders.

15. The method of claim 1, comprising displaying the projected ink stroke visually in the computing system at least in part as a ribbon.

16. The computing system of claim 7, wherein choosing the projection plane comprises:
 identifying principal component vectors based on a region around the ray-mesh intersection point; and
 ascertaining the projection plane based on at least one of the principal component vectors.

17. The computing system of claim 16, wherein the principal component vectors comprise two largest principal component vectors, and ascertaining the projection plane comprises:
 establishing that a largest components plane which is formed by the two largest principal component vectors has a normal vector which is too oblique to a viewer's gaze vector according to an obliqueness threshold, in that an angle between the normal vector of the largest components plane and the viewer's gaze vector exceeds the obliqueness threshold;
 measuring respective angles between the viewer's gaze vector and normal vectors of planes which are formed by respective pairs of principal component vectors other than the two largest principal component vectors; and
 choosing as the projection plane a plane which has a normal vector that makes the smallest measured angle with the viewer's gaze vector.

18. The computing system of claim 17, wherein the obliqueness threshold is at least sixty degrees.

19. The computing system of claim 16, wherein the principal component vectors comprise a smallest principal component vector, an intermediate principal component vector, and a largest principal component vector, and ascertaining the projection plane comprises at least one of:
 choosing as the projection plane a plane which contains the smallest principal component vector and the intermediate principal component vector; or
 choosing as the projection plane a plane which contains the smallest principal component vector and the largest principal component vector.

20. The computing system of claim 16, wherein the principal component vectors comprise two largest principal component vectors, and ascertaining the projection plane comprises:
- establishing that a largest components plane which is formed by the two largest principal component vectors has a normal vector which is too oblique to a viewer's gaze vector according to an obliqueness threshold, in that an angle between the normal vector of the largest components plane and the viewer's gaze vector exceeds the obliqueness threshold; and
- choosing as the projection plane a plane which contains two of the principal component vectors and which has a normal vector that makes an angle with the viewer's gaze vector that is not larger than the respective normal vector of any other plane that contains two of the principal component vectors.

\* \* \* \* \*